UNITED STATES PATENT OFFICE.

FRANK WEBB STOCKTON, OF PITTSBURGH, PENNSYLVANIA.

FOOD PRODUCT.

1,395,934. Specification of Letters Patent. Patented Nov. 1, 1921.

No Drawing. Application filed March 17, 1921. Serial No. 453,099.

*To all whom it may concern:*

Be it known that I, FRANK WEBB STOCKTON, residing at Pittsburgh, in the county of Allegheny and State of Pennsylvania, a citizen of the United States, have invented or discovered certain new and useful Improvements in Food Products, of which improvements the following is a specification.

This application is in part a continuation of an application for United States Letters Patent filed by me August 27, 1919, Serial No. 320,293.

My invention relates to improvements in alimentary pastes of which one ingredient is a solid substance in finely divided condition, and another an oil. The object of the invention is to prevent gravitational separation of the ingredients named. It is applicable, as will hereinafter appear, to oily food pastes generally, but I have developed it in the preparation of nut butter, and particularly of peanut butter, and in that application I shall first describe it.

Peanut butter is prepared by grinding the clean kernels of roasted peanuts; it is a rather stiff, semi-solid substance, resembling real butter in appearance and in consistency. It consists essentially of finely divided particles of nut kernels mixed with oil. The particles of nut kernel contain protein and carbohydrate with minute particles of oil pocketed in the solid mass; the oil is oil which in the operation of grinding has been liberated from its natural minute segregation in the body of the kernel, and which has run together, to form a carrier liquid, in which the particles of ground kernel are suspended. The particles of kernel are insoluble in the liberated oil, and, unlike oleaginous substances, are not fusible at elevated temperature. Peanut kernels contain oil in quantity of about 40–50% of the entire weight. The greater part of the contained oil is liberated by the grinding operation. In addition to the protein, carbohydrates, and oil, peanut butter contains also small quantities of moisture and of mineral salts and other minor ingredients; but with these my invention is not directly concerned, and I shall in this specification give them no further consideration; but shall speak of peanut butter as though consisting wholly, as it does substantially, of a mixture of finely divided nut particles and peanut oil.

Peanut butter is widely used as a food preparation; ordinarily it is spread upon bread like real butter.

A practical difficulty with which one who prepares peanut butter for the market has to deal is the tendency of the components of the substance when prepared to separate. Peanut butter is ordinarily put up in jars and other containers to be sold, and in these containers as they stand waiting sale, the nut particles gravitate toward the bottom of the mass, while the oil rises and forms a clear layer over the top. Such separation is particularly active and difficult to prevent in the summer season and in warm climates. The tendency is aggravated by the shaking incident to conveyance, particularly by railroad. The user, removing from its container material which has so separated, has to mix it again before spreading it upon bread. And if the contents of the container be taken little by little, as ordinarily is the case, then the user finds the substance becoming gradually drier and stiffer as he proceeds with the consumption of the contents of a single container. Again, if peanut butter as ordinarily prepared be allowed to stand in a dish upon a table, or if bread spread with it be allowed to stand before being eaten, a thin layer of oil will soon cover the surface of the substance, and this to some people, is an unappetizing and undesirable effect.

This difficulty of oil separation being foreseen may in only a very partial degree be prevented by coarse grinding; for the finer the grinding of the kernels the more pronounced the tendency to gravitational separation. But coarse ground peanut butter is less desirable. It is mealy and does not spread well, and furthermore it is less readily digested than fine ground butter. Another expedient that has been resorted to, to prevent in some measure this gravitational separation, is to diminish the value of the fraction of oil in the mass. This may be accomplished by using nut kernels of low oil content, or by extracting part of the oil when by grinding the oil has been released, or by adding to the mass ground peanut cake, from which the oil has already been more or less completely pressed out and removed. But by such means the quality of the peanut butter is impaired, for without a generous proportion of oil it does not spread readily, and besides the taste and the nutritive value are diminished. Indeed, rather than to impoverish, it now appears that it is better to enrich peanut butter in this matter of oil component, adding to it more oil than can be derived from the nut kernels; and in the practice of my invention such enrichment becomes feasible. Peanut butter so enriched may in consistency, in spreading quality, in appearance, and in flavor, be made to excel peanut butter produced by mere grinding, and these advantages are attainable while still the chief object of my invention is realized,—a peanut butter, namely, free of the bad tendency to gravitational separation of components.

I shall now describe my preferred procedure in the preparation of peanut butter for the market, and when I have done so I shall indicate wherein variation is permissible.

I prepare a semi-solid fat, by mixing together in the ratio of about 85 to 15 peanut oil in natural state and peanut oil which has been fully hydrogenated. Fully hydrogenated peanut oil is a hard brittle solid, having a melting point at about 58°–60° C. Mixture of this substance with natural peanut oil, which at atmospheric temperatures is liquid, is effected by heating to a higher degree than the melting point of the hydrogenated oil. When cooled again to atmospheric temperature, the mixture forms a mass resembling, and somewhat stiffer than, lard.

Roasted and blanched peanut kernels, and this specially prepared lard-like fat are brought together in proportions, by weight, of approximately 95 to 5, and ordinarily I add finely ground common salt, in quantity amounting to about 2%, by weight, of the whole. The materials so brought together are first intimately mingled and are then ground together in such a mill as is ordinarily employed for grinding nut kernels. The heat incident to grinding will ordinarily suffice to produce a smooth and thoroughly mixed product, though heat may be applied externally if found desirable. The grinding is carried to the degree of fineness preferred, and, ordinarily, fine grinding is preferred. When the grinding is completed the finished article is allowed to cool.

As peanut butter is commonly made the finely ground common salt in the proportion of about 1.8% is mechanically fed into the grinder along with the peanuts and fairly uniformly. But the salt drifts through the mass of peanuts, owing to their movement and the vibration of the machine, irregularly and tends to concentrate toward the bottom of the mass. The result is a very variable distribution of the salt in the product, which may range from 0.5% to 3.0%, because the grinder performs only a comparatively local mixing. (Such variation is strongly noticeable to the taste.) But a uniform salt distribution is very desirable. In my invention the salt is mixed with the peanuts at the time the semi-solid fat is mixed in. The semi-solid fat forms a greasy film over the peanuts and holds the salt in place on the peanuts as mixed, and the salt continues to be so held as the peanuts pass through the grinder until ground into peanut butter. The result is highly uniform salt distribution.

The peanut butter so produced is, by virtue of the intimate mingling of hard fat (which is solid at atmospheric temperature) with the peanut oil (which is a characteristic component of all peanut butter), secure against gravitational separation of its components. The particles of kernel will not sink to the bottom, nor will free oil rise to the surface, but the mass will remain homogeneous throughout, and this for indefinite periods of time and under varying atmospheric conditions. The hard fat as it crystallizes out (or otherwise forms) from solution on cooling forms extremely fine crystals (or particles) uniformly and extremely dispersed which tend to form a network holding the liquid oil. In the ordinary method of grinding peanut butter, there is sufficient heat to partially melt the solid fat particles of the semi-solid fat added, and on cooling they are reformed and probably in finer more effective condition. The cooling takes place in the jars after filling. That is to say, the netting or set takes places in the jar and the peanut butter is not stirred nor the set ordinarily broken until consumption is commenced. I have not found it necessary to stir the peanut butter while cooling. Stirring may in some cases be advisable. If the mass be highly heated during grinding—say to about 100° C. the hot peanut butter would require a day or more to cool. In that case it should be stirred. And there are theoretical reasons for thinking that stirring is advantageous: Stirring always causes formation of finer crystals; slow, quiet cooling always promotes formation of large crystals. But I have found that stirring is not necessary in the case described, when no heating occurs beyond that incident to grinding and when the finished material is introduced into jars; moreover, in such circumstances stirring during cooling would be inconvenient.

A word more should be said about temperatures. It is more effective to grind the hydrogenated oil (or the 15—85 mixture of it mentioned above with peanut oil) with the peanuts while it is heated sufficiently to melt all of it. A somewhat smaller quantity of hydrogenated oil suffices by so doing. This may be simply accomplished as peanut butter is now commonly made by warming the mixture (peanuts, salt, fat) that is fed to the grinder to about 50 degrees centigrade, (the grinding supplying the additional temperature necessary for melting the hard fat.) The 15—85 mixture melts much below the temperature required to melt the hard oil out of contact with the liquid oil. The reason for this greater effectiveness is that being melted the hard fat dissolves in all the peanut oil present including the large volume of free oil from the peanuts and in crystallizing or solidifying out of solution again on cooling, it is in finer softer particles or crystals which are better dispersed, and there are probably some other reasons for it. The increased effectiveness is not of great commercial importance because of the small proportion required anyway. In the ordinary process of carrying out my invention there is partial melting or solution with the heat of grinding. However, with present knowledge it is better to preheat the fatty addition only, for preheating of the peanut mixture before grinding tends to damage the flavor of the resulting butter.

The finished substance may be spread easily; it may by proper grinding be made smoother in consistency than ordinarily is permissible, and it is of proper degree of firmness. When served in a dish or when spread upon bread it will not to the same extent become filmed over, after standing, with free oil. Because of the added quantity of peanut oil the article is richer, of better taste, more easily digested, and more nutritive than ordinary peanut butter. Normally, the product is of somewhat lighter color than peanut butter produced in usual manner; this appearance may be preferred; if not, the color may be modified by adding the substance employed for coloring real butter.

Coming now to matters of variation, I would observe, first, that in the preparation of the semi-solid fat which I combine with the peanut kernels in the grinding machine I am not limited to the particular substances named. In place of the peanut oil in natural condition I may use any other oil of not widely differing physical properties, which will in the finished product afford the desired physical effect, be of desired flavor (which may be modified), and be nutritious. Cottonseed oil may be used, or the oil or other nuts or seeds, or other vegetable oil—olive oil, for example.

In place of hydrogenated peanut oil, I may use other hydrogenated oil—cottonseed oil, cocoanut oil, olive oil are substantial equivalents of peanut oil in this respect. Or, instead of a hydrogenated oil, I may employ some other hard fat of suitable consistency and not unsuited to the essentially alimentary character of the product. For example, I may use stearin, palmitin, or tallow. Stearic acid, beeswax, spermaceti, and paraffin are examples of fat-like substances more or less suitable to produce the mechanical effects desired; they are, however, less desirable as food ingredients. But enough has been said to indicate the range of substances from which choice may be made.

Istead of a mixture of hard fat and oil, I may employ a homogeneous semi-solid fat. Cocoa butter, for example, may be used, or lard, or "Crisco", or one of the oils already mentioned (peanut oil, cottonseed oil, cocoanut oil, etc.) more or less completely hydrogenated—that is to say, hydrogenated to such degree as to afford the consistency desired. If the semi-solid fat chosen be found inadequate under all conditions to prevent gravitational separation, a larger or smaller addition of hard fat to it may be made.

In the preparation of the typical product described above, peanut oil in natural condition is added, for the purpose of enriching the product. It is not requisite to the invention in its broader aspect that this addition of oil in natural condition be made. The gravitational separation of the ingredients of peanut butter may be prevented by adding thereto a component whose value lies chiefly or wholly in the mechanical gain of a product free from liability to separation. Stearin alone may be added, or palmitin, or tallow, or fully hydrogenated oil—or the softer substances mentioned already or a mixture of one or more of them. It will be understood that, given a separation-preventing fat (fully hydrogenated peanut oil, for example), less of it will be required, if it alone be combined with the ground peanuts, than if to the mixture be added also an enriching quantity of peanut oil in natural condition. I have said that the semi-solid fat first described above may be used in an amount equivalent to 5% by weight of the whole; and this semi-solid fat was described to be compounded of 15% of fully hydrogenated peanut oil and 85% of peanut oil in natural condition. In such case the quantity of fully hydrogenated oil present in the finished product is about 0.75%. If, however, the fully hydrogenated oil alone were added to the nut kernels, without any new supply of peanut oil in natural state beyond what the kernels themselves afford, manifestly a smaller quantity of hydrogenated oil would be required—from 0.50 to 0.25%.

I have described the mixing of the components as incident to the grinding operation. This, though manifestly a convenient procedure, is not a requisite one. The nut kernels may be ground initially by themselves, and to the ground nuts the other components may be added. Indeed, peanut butter prepared in the ordinary way may in the practice of my invention be made over, and that with the gains already indicated. If the semi-solid fat described above be mixed with ready-made peanut butter without any heating, the tendency to jointing of the solid fat particles and net formation and slight set, still exists.

In any case the quantity of hard fat added will advisedly be kept at a minimum; there should be enough to prevent gravitational separation and not so much as to stiffen the butter unduly and impair spreading quality. Accordingly, in practising the invention, regard may be had to the conditions and places and seasons of intended use, and more or less of the harder fat added, and choice made between possible ingredients of varying degrees of hardness, according as the product is to be shipped to the tropics or to colder countries, to be kept through a summer or consumed before warm weather begins— and so on.

With the proper proportion of hard fat, peanut butter prepared according to my invention spreads better, because of the better suspension and lubrication of the particles which is afforded by the less liquid fat. In a jar of peanut butter with oil separated on top, the oil slops up on the rubber sealing ring, and deteriorates it. On account of this free oil a certain well known and otherwise very desirable seal cannot be used because a soft uncured compound is used in it and the peanut oil softens and apparently dissolves this compound. With sufficient hard oil in the peanut butter to prevent the peanut oil from reaching the compound, this most desirable seal can be used on peanut butter.

Ordinary peanut butter is difficult to "hold", that is, oil will leak from it. The peanut butter of my invention is in this respect an improvement upon ordinary peanut butter.

Thus far I have limited attention to peanut butter. It remains to say briefly that the invention is applicable to the preparation of nut butters generally; to the preparation of such alimentary pastes as include particles of infusible, insoluble material suspended in an oily carrier.

My invention resides in method and in product; and, again, with product particularly in mind, the invention appears when the mass of substance in and of itself is considered, and also when attention is turned to the container filled with the substance. The producer is concerned, that his package shall not deteriorate, on its way to the consumer's hands; the consumer is concerned, that the contents of the package shall be satisfactory in use.

In the foregoing specification I have used the term oil as applied to a liquid distinctively, and the term fat as applied to a solid. In the ensuing claims I shall use the term fat in its proper and broader sense, including all the range of oleaginous substances named and contemplated, whether in common parlance they be termed oils, fatty acids, or waxes, and whether they be at atmospheric temperatures liquids, or solids, or of intermediate consistency.

I claim as my invention:

1. The method herein described of preparing nut butter in order to prevent gravitational separation of the ingredients thereof which consists in mixing with the nut kernels a normally solid fat and grinding the mixture to a homogeneous pasty mass.

2. The method herein described of preparing a nut butter in order to prevent gravitational separation of the ingredients thereof which consists in mixing with the nut kernels a semi-solid fat compounded of a fat solid at atmospheric temperatures and another fat of lower melting point, and grinding the mixture to a homogeneous pasty mass.

3. A nut butter including crushed nut particles suspended in a fatty carrier of which one component is a fat released from the nut kernels by crushing and another component is a normally solid fat added in sufficient quantities and incorporated therewith to form a substantially stable homogeneous pasty mass.

4. A nut butter consisting of oleiferous nut kernels and a fat of itself solid at atmospheric temperatures, the said ingredients being ground together and incorporated to form a substantially stable homogeneous pasty mass.

5. A nut butter compounded of oleiferous nut kernels and a semi-solid fat, said semi-solid fat being compounded of a fat which is solid at atmospheric temperatures with another fat of lower melting point, such semi-solid fat being capable of thorough admixture with the oil of the nut kernels, the compound being incorporated to form a substantially stable homogeneous pasty mass.

6. Vegetable butter consisting of pulverized nut kernels containing the oil liberated in the process of pulverizing said kernels and having added thereto a mixture of free and hydrogenated vegetable oil of substantially nut flavor.

7. Vegetable butter consisting of pulverized nut kernels and the oil liberated in the grinding thereof, and having added thereto a mixture consisting of oil of said nuts and hydrogenated oil of said nuts.

8. A container filled with a nut butter consisting of particles of crushed oleiferous nut kernels and a carrier compounded of fat released from the nut kernels by crushing with a normally solid fat, the whole being incorporated into a homogeneous pasty mass.

9. A container filled with peanut butter its components held against gravitational separation by a stroma of heavier fat intimately mingled therewith.

In testimony whereof I have hereunto set my hand.

FRANK WEBB STOCKTON.

Witnesses:
 BAYARD H. CHRISTY,
 FRANCIS J. TOMASSON.